Jan. 6, 1970  A. A. LOFQUIST, JR  3,488,763
ROLLING SEAL PUMP
Filed Feb. 16, 1968
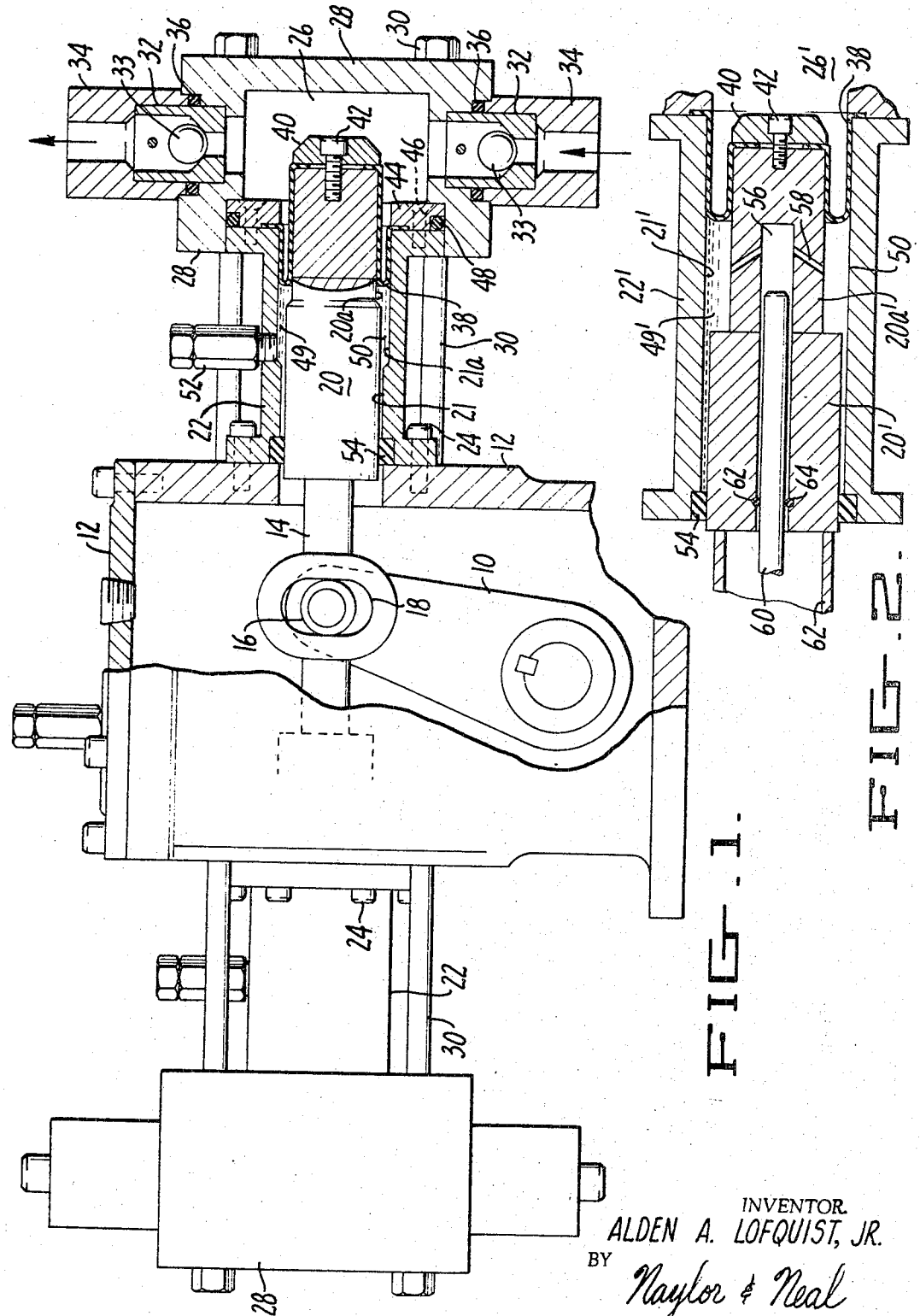
INVENTOR.
ALDEN A. LOFQUIST, JR.
BY
Naylor & Neal
ATTORNEYS

United States Patent Office 3,488,763
Patented Jan. 6, 1970

3,488,763
ROLLING SEAL PUMP
Alden A. Lofquist, Jr., 4 Rita Way,
Orinda, Calif. 94563
Filed Feb. 16, 1968, Ser. No. 705,955
Int. Cl. F04b 43/02; F01b 19/02; F16j 3/00
U.S. Cl. 103—150                                4 Claims

ABSTRACT OF THE DISCLOSURE

A rolling seal pump with a constant volume fluid backing chamber supporting the flexible diaphragm which is radially attached to the wall of the piston chamber and to the end of a reciprocating piston for high-pressure and high-volume pumping of fluids which are corrosive, abrasive or which cannot be contaminated.

---

This invention relates to improvements in the design and construction of reciprocal pumps and more specifically to the incorporation of a high-pressure diaphragm seal in a piston-type pump.

In accordance with this invention, a rolling seal diaphragm provides a fluid seal between a cylindrical wall and a piston movable axially within the cylinder. A volume of incompressible fluid behind the diaphragm supports the diaphragm. The "rolling" part of the diaphragm moves on each stroke of the piston by a distance equal to one-half of the piston stroke so that movement of the "rolling" portion of the diaphragm changes the volume of the liquid-containing cavity by a volume equal to $(\pi R_c^2 - \pi R_p^2)L/2$ where $R_c$ and $R_p$ are the radii of the cylinder and piston, respectively, and L is the length of the stroke of the piston with respect to the cylinder.

In the preferred form of the invention as shown in the drawing, this potential change in fluid chamber capacity is exactly compensated by an opposite change in fluid chamber capacity caused by movement of a portion of the piston with proper diameter into the fluid chamber.

In other forms of the invention, the potential change in fluid chamber capacity is usually compensated by an opposite change in fluid chamber capacity caused by separate secondary piston-cylinder combination operated mechanically by the linear movement of the primary piston. This secondary piston has a cross-sectional area selected to pump into or withdraw from the fluid chamber an amount of fluid supporting the diaphragm sufficient to balance the change caused by movement of the diaphragm.

The principal object of the invention is to provide a general type piston pump with an absolute compression chamber seal capable of high-pressure and high-volume pumping of liquids that may be corrosive, abrasive or that cannot be contaminated.

A more specific object of the invention is to provide a novel diaphragm-type piston seal able to withstand high and variable pressures generated in the compression chamber.

It is another object of the invention to provide a flexible rolling seal diaphragm in a pump that is not subject to tensile forces during operation.

It is a further object of the invention to provide a pump construction utilizing a flexible diaphragm material that need not be of great strength or elasticity.

Other objects and advantages of the invention will become apparent upon full consideration of the following description and attached drawing in which:

FIG. 1 is a side elevation view, partially in section of a conventional double-action piston pump showing the novel diaphragm seal and piston construction.

FIG. 2 is a side elevation view, in section, of a modified form of the piston casing and piston showing the novel diaphragm and a modification to the casing and piston construction of FIG. 1.

Referring now in detail to the drawing, the preferred form of the invention comprises a double-action piston assembly shown in FIG. 1, driven by a reciprocating crank 10, encased in a crank housing 12. The crank 10 is connected to a piston rod 14 by pin 16 and a slot 18 arrangement, converting the radial drive to lineal. Two pistons 20 (one not visible) are firmly affixed to the piston rod 14, each moving longitudinally in a cylinder 21 formed by piston casings 22 either fixed to or a part of the crank housing 12. Compression chambers (one shown in sectional view) 26 are formed by rectangular casings 28 capping the cylindrical piston casings 22 and directly secured to the crank housing 12 by machine studs 30.

Turning more specifically to the portion of the drawing that is shown in section, it can be seen that fluid flow in the compression chamber may be directed by conventional check valves 32. Here, floating ball valves 33 are chosen for their simplicity of design, although any suitable means of directionally regulating flow may be employed. The ball valves 33 are fixed in place by annular collars 34 and sealed by compressible O-rings 36.

The compression chamber 26 is hermetically sealed by a flexible rolling diaphragm 38. The rolling diaphragm 38 is radially attached to the piston 20 by a compression cap 40 secured by a bolt 42. The other end of the rolling diaphragm 38 is radially attached to the cylinder wall of the piston casing 22 by an annular retainer ring 44 which is secured by a plurality of bolts 46. The retainer ring 44 is notched on its outer periphery to provide a seating for an O-ring 48 which seals the joint between the piston casing 22 and the compression chamber casing 28.

The rolling diaphragm 38 separates the compression chamber 26 from a fluid backing 49 which is incompressible, preventing the diaphragm 38 from stretching on the compression stroke or collapsing on the suction stroke. If the pressure of the fluid backing 49 matches the pressure of a fluid being pumped in the compression chamber 26 throughout the reciprocal cycle, the diaphragm 38 is subject only to compressive forces. This important feature is accomplished by creating a fluid backing chamber 50 that remains at constant volume throughout a reciprocal cycle. The fluid backing chamber 50 is formed by increasing the diameter of a segment of the cylinder 21 nearest the compression chamber 26 as indicated at 20a, and reducing the diameter of the end segment of the piston 20 as indicated at 20a. Between the compression chamber 26 and the unchanged segments of piston 20 and cylinder 21 an annular cavity constituting the fluid backing chamber 50 is created with the full diameter portion of the piston 20 reciprocating into the chamber 50.

The diaphragm 38 seals the compression chamber 26 from this fluid backing chamber 50. The diameters of the reduced part 20a of the piston and the increased part 21a of the cylinder are chosen so that any change in the volume of the chamber 50 caused by movement of the piston 20 is automatically compensated by movement of the diaphragm 38.

This is accomplished in the present invention by providing that the diameter of the unreduced piston 20 substantially equals the square root of one-half the sum of the squares of the increased cylinder diameter 21a and the reduced piston diameter 20a. Although the shape of such backing chamber 50 changes throughout a reciprocal cycle, the volume remains constant.

Thus, where the diameter of piston 20 is D, the diameter of the reduced portion 20a is $D_i$ (inside diameter of chamber 50), and the diameter of the enlarged portion 21a of the cylinder is $D_o$ (outside diameter of chamber 50), this relation is expressed by the following equation.

$$D^2 = \frac{D_i{}^2 + D_o{}^2}{2}$$

In the modified invention illustrated in FIG. 2, the change in volume of the fluid backing chamber 50' caused by the relative movement of the piston 20' with the movement of the diaphragm 88 is automatically compensated by fluid 49' injected into or ejected from the backing chamber by a reservoir 56 communicating with the fluid backing chamber 50' through arteries 58 extending from the internal portion of the piston 20' to a point on the piston surface which will permit free passage of fluid to and from the backing chamber 50' at all times during a reciprocal stroke of the piston 20'. In the preferred form of the modification, this reservoir 56 is a cylindrical chamber situated in an internal portion of the piston 20'. Fluid is pumped into the backing chamber 50' by a secondary piston or rod 60 extending longitudinally into the reservoir 56 from the end of the piston 20' opposite the compressing chamber 26'. The rod 60 remains stationary in relation to the outer piston casing 22'. Thus, when the piston 20' reciprocates, the reservoir 56 moves in relation to the stationary rod 60 creating a pumping action. If the diameter of the rod 60 substantially equals the square root of one-half the remainder of the squares of the cylinder diameter 21' less the reduced piston diameter 20a', the displacement caused by relative movement of the diaphragm 38 is exactly compensated by the volume pumped by the rod 60. Thus, if the diameter of the cylinder 21' is $D_o{}'$ (outside diameter of chamber 50') and the diameter of the reduced piston 20a' is $D_i{}'$ (inside diameter of chamber 50') then the diameter of the rod $D_r$, may be expressed by the following equation:

$$D_r = \sqrt{\frac{(D_o{}')^2 - (D_i{}')^2}{2}}$$

When such a relationship exists, the fluid backing chamber 50' and reservoir 56 when taken as an integrated system remain at constant volume throughout a reciprocal cycle.

To facilitate mounting of the rod 60, the piston rod 14 of the primary invention is replaced by a hollow tube 62. Instead of being driven by a crank, the piston 20' may be driven hydraulically by liquid or gas pressures. The reservoir 56 is sealed by an O-ring 62 seated in a groove 64 in the wall of the reservoir 56 forming an annular liquid seal around the stationary rod 60.

The modification in FIG. 2 differs from the primary invention in that the constant volume, fluid-backing system for the diaphragm 38 is maintained without changing the diameter of the piston casing 22' forming the cylinder 21'.

Considering again the primary invention, the actual dimension of the clearance between piston 20 and cylinder 21 forming the backing chamber 50 may vary according to the characteristics of the material selected for the diaphragm 38 and the seal 54. Since only compressive forces are exerted on the diaphragm 38, the material need be only flexible, and can be very thin and made from a variety of materials depending on their particular suitability for the substance being pumped. The thickness and degree of flexibility of the diaphragm material are the only limitations in minimizing this clearance.

The increase in cylinder diameter and reduction of piston diameter continues for at least a length equal to one-half the piston stroke to allow for proper seating of the diaphragm 38 throughout the piston stroke.

The fluid backing chamber 50 is filled with an incompressible fluid having the characteristic of ability to flow in conformance to changes in the shape of the backing chamber. To reduce drag from the reciprocating piston, it is preferred the fluid be of low viscosity. However, a fluid of extremely high viscosity would have the offsetting advantage of lower operational leakage. Preferably, the backing chamber 50 contains a medium weight oil which also performs the function of lubricating piston 20 and cylinder 21.

To prevent loss of fluid from the fluid backing chamber 50, a conventional sealing means may be employed. Here a standard packing 54 forms both a gasket for the flanged end of the piston casing 22 and a packing for the piston 20.

Unlike the prior art, the pumping pressure in the present invention is not limited by the strength of the diaphragm 38 since no pressure differential exists from one side of the diaphragm to the other. The possibility of diaphragm failure by blowout has been virtually eliminated, and the operational life of the diaphragm is greatly increased by eliminating ruptures caused by repeated stretching of the diaphragms.

The present embodiment of the invention herein described in the specification and shown in the drawing is only illustrative. Many modifications to the form and to the type of apparatus employing this rolling seal diaphragm can be made, and the invention can be used in other reciprocating seal devices such as meters, hydraulic accumulators, expansion joints, and the like.

What is claimed is:

1. A high pressure rolling diaphragm seal for reciprocating pistons comprising a casing forming an elongated constant diameter cylinder, a reciprocating piston mounted in said cylinder, a fluid backing chamber formed by a reduction in the diameter of a segment of the piston continuing for at least the length of one-half the piston stroke, a flexible rolling diaphragm sealing said fluid backing chamber with said diaphragm attached to the inner wall of said cylinder casing and attached to said piston with an intermediate rolling portion of the diaphragm in rolling engagement with the cylinder wall and the piston wall of reduced diameter, a cylindrical reservoir extending longitudinally into the piston from the end opposite that sealed by the rolling diaphragm, a rod mounted in fixed position with respect to said casing and extending into said reservoir and having a diameter equal to the square root of one-half the remainder of the squares of the cylinder diameter less the reduced piston diameter, at least one artery connecting the cylindrical reservoir with the fluid backing chamber, sealing means in the cylindrical reservoir providing a liquid seal between the stationary rod and reservoir, sealing means in the elongated constant diameter cylinder providing a liquid seal between the unreduced piston and said cylinder, and an incompressible fluid contained in said fluid backing chamber and said reservoir.

2. A high pressure, rolling diaphragm seal for reciprocating pistons comprising a casing forming an elongated cylinder, a reciprocating piston mounted in said elongated cylinder, a fluid backing chamber formed by a reduction in the diameter of a segment of the piston continuing for at least the length of one-half the piston stroke, a flexible rolling diaphragm sealing said fluid backing chamber with said diaphragm attached to the inner wall of said cylinder casing and attached to said piston with an intermediate rolling portion of the diaphragm in rolling engagement with the cylinder wall and the piston wall of reduced diameter, means communicating with the fluid backing chamber and physically connected to the piston for pumping into and out of said fluid chamber during each reciprocal cycle an amount of fluid substantially equal to that displaced by the rolling seal equalling $\pi$ times one-half the cylinder diameter squared less one-half the reduced piston diameter squared times one-half the length of the stroke of the reciprocating piston, sealing means in the cylinder providing a liquid seal between the unreduced piston and said cylinder, and an incompressible fluid contained in the fluid backing chamber between said sealing means and said rolling diaphragm.

3. A diaphragm pump comprising a casing forming an elongated cylinder having a fluid input opening therein, a reciprocating primary piston mounted in said elongated cylinder, a flexible diaphragm having one end attached to said cylinder and its opposite end attached to said piston with said diaphragm having an intermediate portion extending between the cylinder and the piston and defining with said piston and casing a fluid chamber in said casing on the opposite side of said diaphragm from said inlet opening, an auxiliary piston cylinder combination with the piston and cylinder thereof movable with respect to each other and connected to said primary piston to be moved with respect to each other responsive to movement of said primary piston with respect to said casing, passageway means connecting the cylinder of said auxiliary piston cylinder combination to said fluid chamber, and a body of incompressible fluid filling said fluid chamber, said passageway means and said auxiliary piston cylinder combination.

4. The apparatus of claim 3 characterized further in that said second piston cylinder combination is mounted inside of said primary piston with the piston of said combination connected to said casing and with said passageway means extending through said primary piston into said fluid chamber.

References Cited

UNITED STATES PATENTS

| | | | |
|---|---|---|---|
| 2,342,906 | 2/1944 | Smith | 103—148 |
| 2,545,506 | 3/1951 | Walsh | 103—204 |
| 3,241,379 | 3/1966 | Rietdijk | 92—98 |
| 3,279,381 | 10/1966 | Robertson | 103—158 |
| 3,327,633 | 6/1967 | Duinker et al. | 103—150 |

FOREIGN PATENTS 961,750   6/1964   Great Britain.

WILLIAM L. FREEH, Primary Examiner

U.S. Cl. X.R.

92—98; 74—18.2